No. 616,171. Patented Dec. 20, 1898.
H. M. WILLIAMS.
COMBINED RAIL JOINT AND DEVICE FOR PREVENTING SPREADING OF RAILS.
(Application filed Feb. 4, 1898.)
(No Model.) 2 Sheets—Sheet 1.
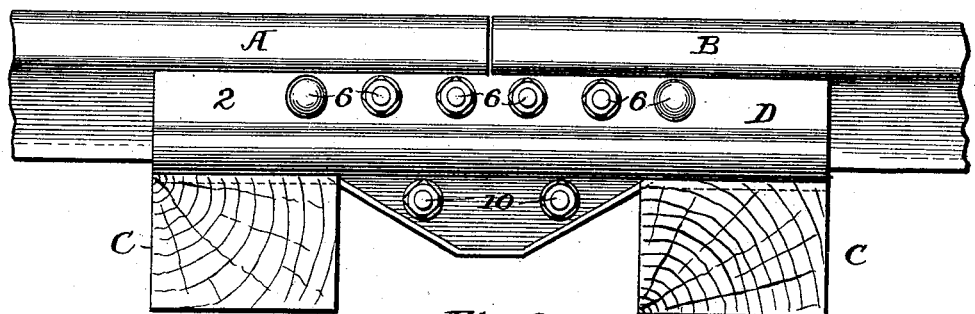
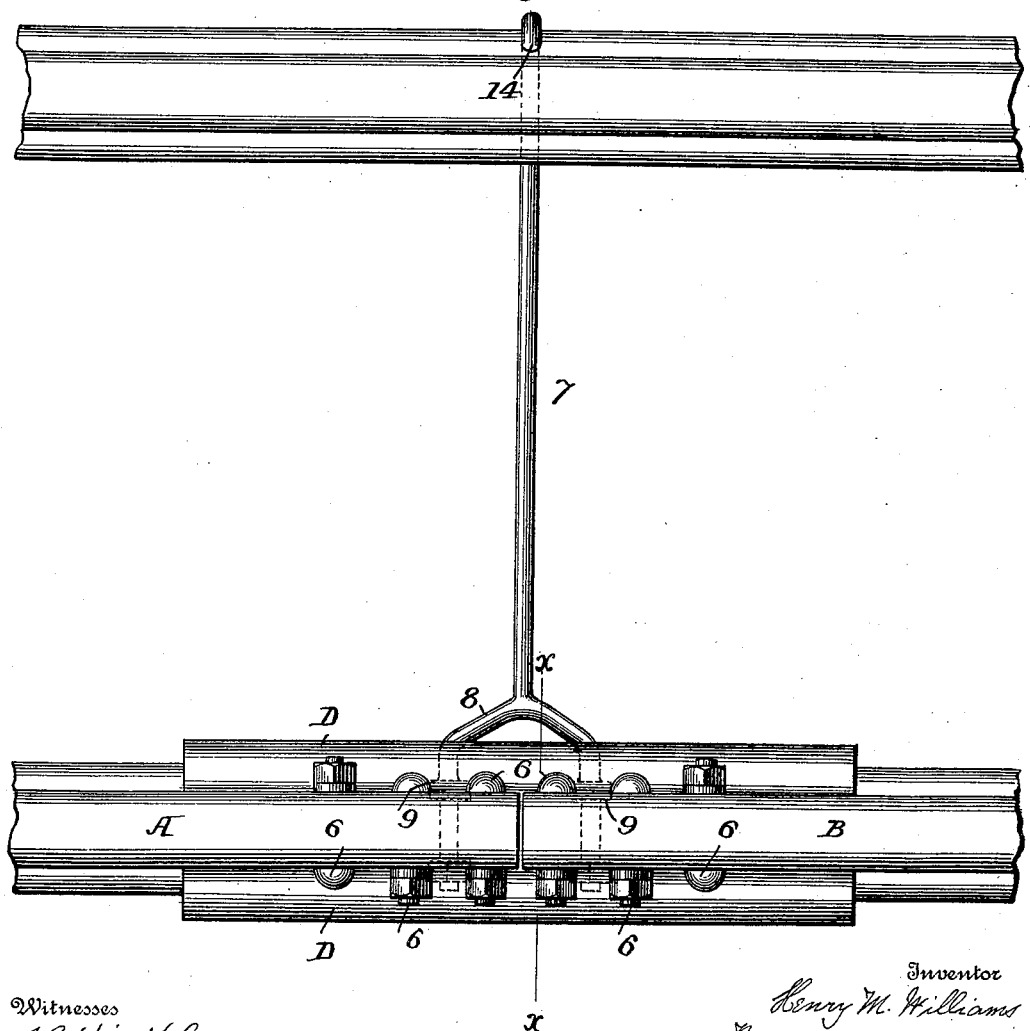
Witnesses
J. G. Hinkel
Harry E. Hay
Inventor
Henry M. Williams
By
Foster Freeman
Attorneys
THE NORRIS PETERS CO., PHOTO-LITHO., WASHINGTON, D. C.

No. 616,171. Patented Dec. 20, 1898.
H. M. WILLIAMS.
COMBINED RAIL JOINT AND DEVICE FOR PREVENTING SPREADING OF RAILS.
(Application filed Feb. 4, 1898.)
(No Model.) 2 Sheets—Sheet 2.
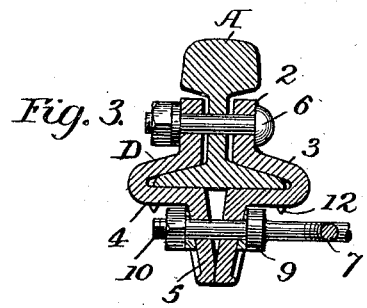
Fig. 3.
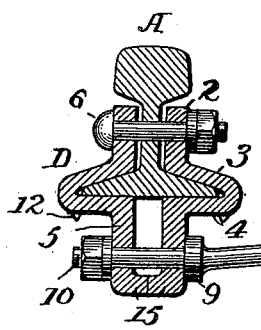
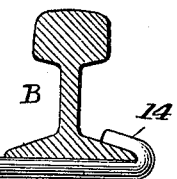
Fig. 4.
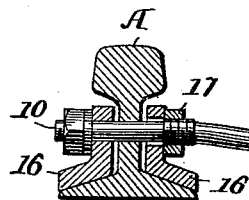
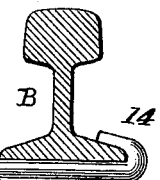
Fig. 5.
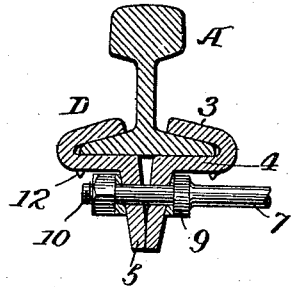
Fig. 6.
Witnesses
J. G. Hinkel
Harry E. Hay.
Inventor
Henry M. Williams
By
Foster Freeman
Attorneys

UNITED STATES PATENT OFFICE.

HENRY M. WILLIAMS, OF FORT WAYNE, INDIANA, ASSIGNOR OF ONE-FOURTH TO FRANZ BURGER, OF SAME PLACE.

COMBINED RAIL-JOINT AND DEVICE FOR PREVENTING SPREADING OF RAILS.

SPECIFICATION forming part of Letters Patent No. 616,171, dated December 20, 1898.

Application filed February 4, 1898. Serial No. 669,092. (No model.)

*To all whom it may concern:*

Be it known that I, HENRY M. WILLIAMS, a citizen of the United States, residing at Fort Wayne, in the county of Allen and State of Indiana, have invented certain new and useful Improvements in a Combined Rail-Joint and Devices for Preventing the Spreading of Rails, of which the following is a specification.

This invention relates to certain new and useful improvements in combined rail-joints and devices for preventing the spreading of rails, having for its object to provide a simple, rigid, and effective joint whereby the ends of abutting rails may be maintained in perfect alinement and withstand the shocks and thrusts consequent to trains passing over them; and with this object in view the invention consists in the novel construction and arrangement of the parts hereinafter more particularly pointed out.

In the accompanying drawings, forming a part of this specification and in which like letters and numerals of reference indicate corresponding parts, Figure 1 is a side elevation of two abutting rails with a joint embodying the invention applied thereto, parts of the rails being broken away. Fig. 2 is a plan view of a portion of a track with the improved joint and the means for preventing the spreading of the rails applied thereto. Fig. 3 is a cross-sectional view on the line $x\ x$, Fig. 2. Figs. 4, 5, and 6 are views of modifications.

Referring more particularly to the drawings, A and B designate the rails of a track, C the cross-ties thereof, and D the rail-joint applied to the ends of two abutting rails for securing them rigidly together. Each of these joint-sections is formed with a vertical portion 2, an inclined portion 3, a horizontal portion 4, and a depending portion 5. The vertical portion 2 of the joint-sections are adapted to bear upon the webs of the rails, but are of less width than said webs in order to prevent their upper edges coming in contact with the under faces of the heads of the rails. The inclined and horizontal portions 3 4 of the sections are adapted to receive the bases of the rails between them and conform to the upper and lower faces thereof, respectively, and the depending portions 5, which do not extend the whole length of the sections, are adapted to project below the rails between two adjacent cross-ties. The faces of these depending portions are inclined with respect to each other, their only point of contact being at their lower edges.

In practice the joint-sections are placed upon opposite sides of two abutting rails. Bolts 6 are then passed through coinciding holes in the vertical portions 2 and the webs of the rails and the said portions are drawn into close contact with the said webs. The depending portions 5 of the joint may then be drawn together by means of ordinary bolts to cause the sections to closely conform to the base of the rail; but preferably this is effected by means of a tie-rod 7, provided at one end with a fork 8, the branches of which extend parallel to each other. These branches of the fork are provided near their ends with shoulders or collars 9, while at their extreme ends they are provided with screw-threads, and the said branches extend through holes in the opposing depending portions 5 of the joint, and their shoulders are drawn into contact with the portion 5 at one side of the joint by means of nuts 10, received upon the ends of the branches and bearing upon the outer face of the opposite depending portion, thereby drawing the lower edges of the said depending portions into firm contact. The rod 7 extends across the track from the rails A to the rails B, and at its end it is provided with a bearing for engagement with the latter rails to prevent their lateral movement with respect to the opposite rails. As shown, this bearing is in the form of a hook 14, which extends beneath the rail-base between two adjacent cross-ties and embraces the outside edge of the said base. It will thus be seen that the rod 7 not only serves to secure the sections of the rail-joint together, but, in addition, constitutes a simple and effective means for preventing the spreading of the opposite rails of the track. Moreover, it will be noted that by securing the rod 7 to the rail-joint at separated points the lateral movement of its opposite or hooked end is prevented. The opposite ends of the joint-sections rest upon the upper faces of two adjacent cross-ties, and the depending portions thereof extend between the ties, and in order that lateral shifting of the joint-sections may be prevented said sections are provided upon their lower faces with ribs 12, which are preferably wedge-shaped in cross-section and are adapted to enter the cross-ties. The said ribs, as shown, extend transversely across the cross-ties and serve to hold the joint-sections firmly in position, rendering other means for securing said sections to the cross-ties unnecessary, although such means may be employed, if desired.

It will be obvious that by arranging the upper edges of the vertical portions 2 of the joint-sections out of contact with the under faces of the heads of the rails they are relieved of all strain which is ordinarily imposed upon them, such strain being taken up by the depending portions of the joint, and consequently there is little liability of the securing-bolts of said vertical portions being loosened, said bolts remaining tight and maintaining the vertical portions 2 in firm contact with the webs of the rails.

In the modification illustrated in Fig. 4 the depending portions 5 of the opposite joint-sections extend parallel to each other, and at their lower edges they are provided with ribs or bearings 15, which rest in contact when the parts are assembled and serve to maintain the inner faces of the depending portions out of contact with each other.

In the construction shown in Fig. 5 the rail-joint is composed of the ordinary L-shaped fish-plates 16, placed upon opposite sides of the rails, and these plates are secured in position by the branches of the fork 8, which extend through the plates and through holes in the webs of the rails, one of the branches extending through the fish-plates and one of the rails, while the other branch passes through the plates and the abutting rail, the fork thereby constituting a bond between the rails and preventing their separation.

In lieu of forming the bearings or shoulders 9 integral with the branches of the fork 8, as indicated in Figs. 1 to 4, the said branches are provided near their ends with threaded portions for reception of nuts 17, and these nuts constitute the bearings for engagement for the fish-plates or joint-sections. By means of this construction it will be obvious that any looseness which may exist between the hook or bearing 14 and the rails B may be easily taken up by adjusting the nuts 17 to the right and then tightening the nuts 10.

The modified construction illustrated in Fig. 6 is substantially identical with that shown in Figs. 1, 2, and 3. The vertical portions 2 of the joint-sections and the securing-bolts 6 are, however, omitted, the joint-sections being held in position only by means of the tie or gage rod 7.

Without limiting myself to the precise construction and arrangement of the parts shown and described, since various changes in such construction and arrangement may be made without departing from the spirit and scope of the invention and some features may be used without others,

What I claim is—

1. In a rail-joint, the combination of abutting rails, joint-sections upon opposite sides of the rails, a fork for securing the joint-sections to the rails, one branch of said fork passing through one of the rails and another branch thereof passing through the abutting rail, and nuts upon the ends of the fork branches, substantially as described.

2. The combination with the parallel rails of a railway-track, of a rail-joint connecting abutting rails at one side of the track, and a tie-rod formed at one end with a fork, the branches of which extend through openings of the rail-joint and receive nuts at their ends, said rod extending across the track and being provided at its opposite end with a bearing for engaging the rail at the other side of the track, substantially as described.

3. A tie-rod for railway-tracks formed at one end with a fork having branches with parallel threaded ends, substantially as described.

4. A tie-rod for railway-tracks formed at one end with a fork having branches with parallel threaded ends, said branches being provided near their threaded portions with bearings, substantially as described.

5. A tie-rod for railway-tracks formed at one end with a fork having branches with parallel threaded ends and at its other end formed with a hook, substantially as described.

In testimony whereof I have signed my name to this specification in the presence of two subscribing witnesses.

HENRY M. WILLIAMS.

Witnesses:
GEO. K. TORRENCE,
J. BURGER.